(12) United States Patent
Shintani

(10) Patent No.: US 11,115,603 B2
(45) Date of Patent: Sep. 7, 2021

(54) IMAGE PICKUP APPARATUS THAT REDUCES TIME REQUIRED FOR LIGHT CONTROL PROCESSING AND METHOD OF CONTROLLING SAME

(71) Applicant: CANON KABUSHIKI KAISHA, Tokyo (JP)

(72) Inventor: Takuya Shintani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 16/369,000

(22) Filed: Mar. 29, 2019

(65) Prior Publication Data

US 2019/0313003 A1    Oct. 10, 2019

(30) Foreign Application Priority Data

Apr. 4, 2018    (JP) .............................. JP2018-072584

(51) Int. Cl.
   *H04N 5/235*    (2006.01)
   *H04B 10/50*    (2013.01)
   *G06K 9/00*    (2006.01)

(52) U.S. Cl.
   CPC ....... *H04N 5/2354* (2013.01); *G06K 9/00255* (2013.01); *H04B 10/502* (2013.01); *H04N 5/2351* (2013.01); *H04N 5/2357* (2013.01)

(58) Field of Classification Search
   CPC ................................................... H04N 5/2357
   See application file for complete search history.

(56) References Cited

U.S. PATENT DOCUMENTS

| 2018/0241946 A1* | 8/2018 | Shintani | H04N 5/23245 |
| 2019/0246028 A1* | 8/2019 | Osawa | H04N 5/35563 |

FOREIGN PATENT DOCUMENTS

| JP | 2005184508 A | 7/2005 |
| JP | 2013042237 A | 2/2013 |

* cited by examiner

*Primary Examiner* — Gary C Vieaux
(74) *Attorney, Agent, or Firm* — Rossi, Kimms & McDowell LLP

(57) ABSTRACT

An image pickup apparatus that performs, when photographing an object, photographing by causing a light emission device to emit light to the object. A photometry sensor selectively obtains a first image having a first resolution and a second image having a second resolution lower than the first resolution, as a photometric image, and performs photometry using the obtained photometric image to thereby obtain a result of photometry. When performing light control processing for determining a main light emission amount for causing the light emission device to perform main light emission for photographing the object, the light control is switched between first control for performing light control processing based on the first image and second control for performing light control processing based on the second image, according to a result of determination of whether or not a predetermined condition is satisfied.

25 Claims, 11 Drawing Sheets

ALL-PIXEL READOUT

PIXEL ADDITION READOUT

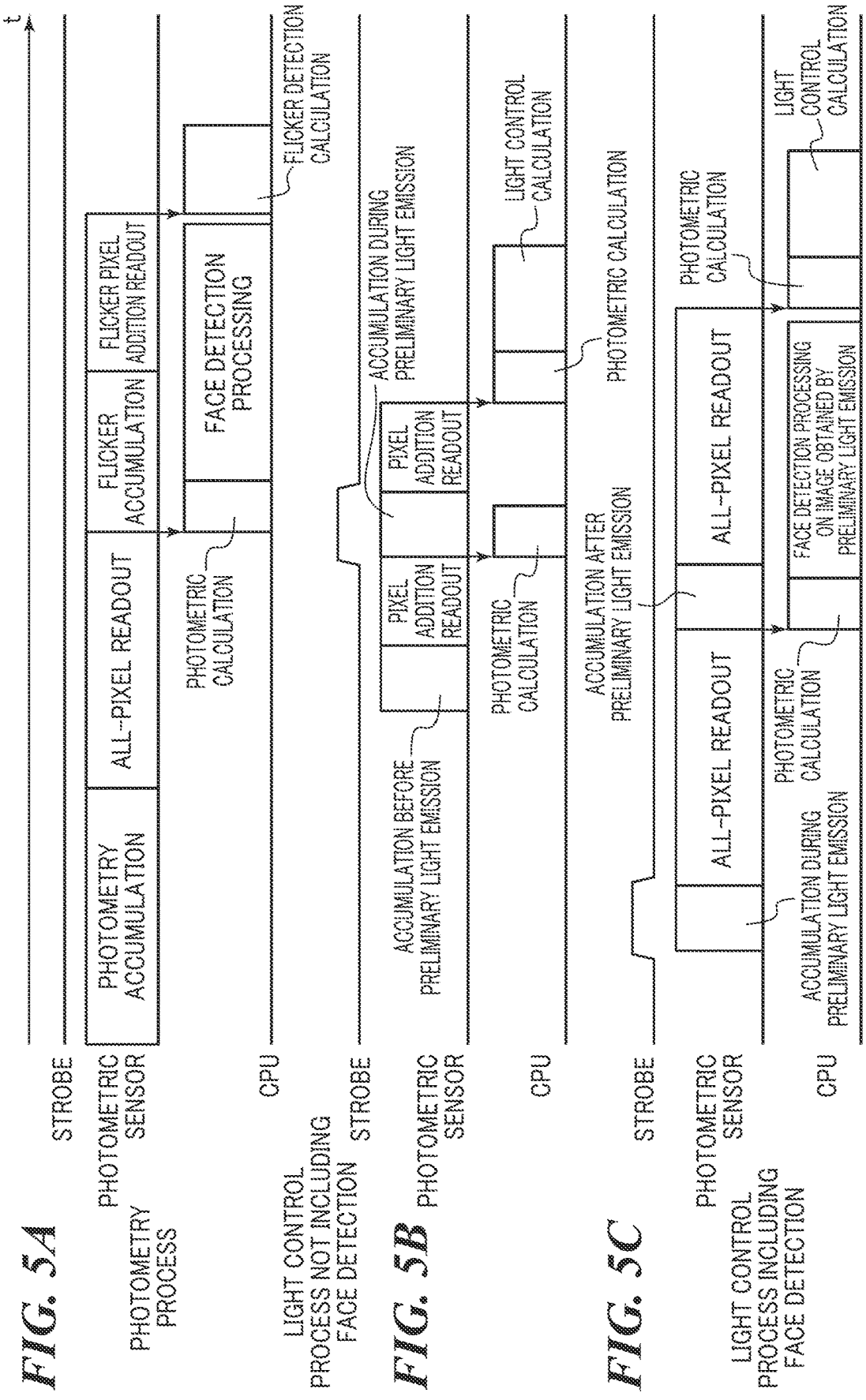

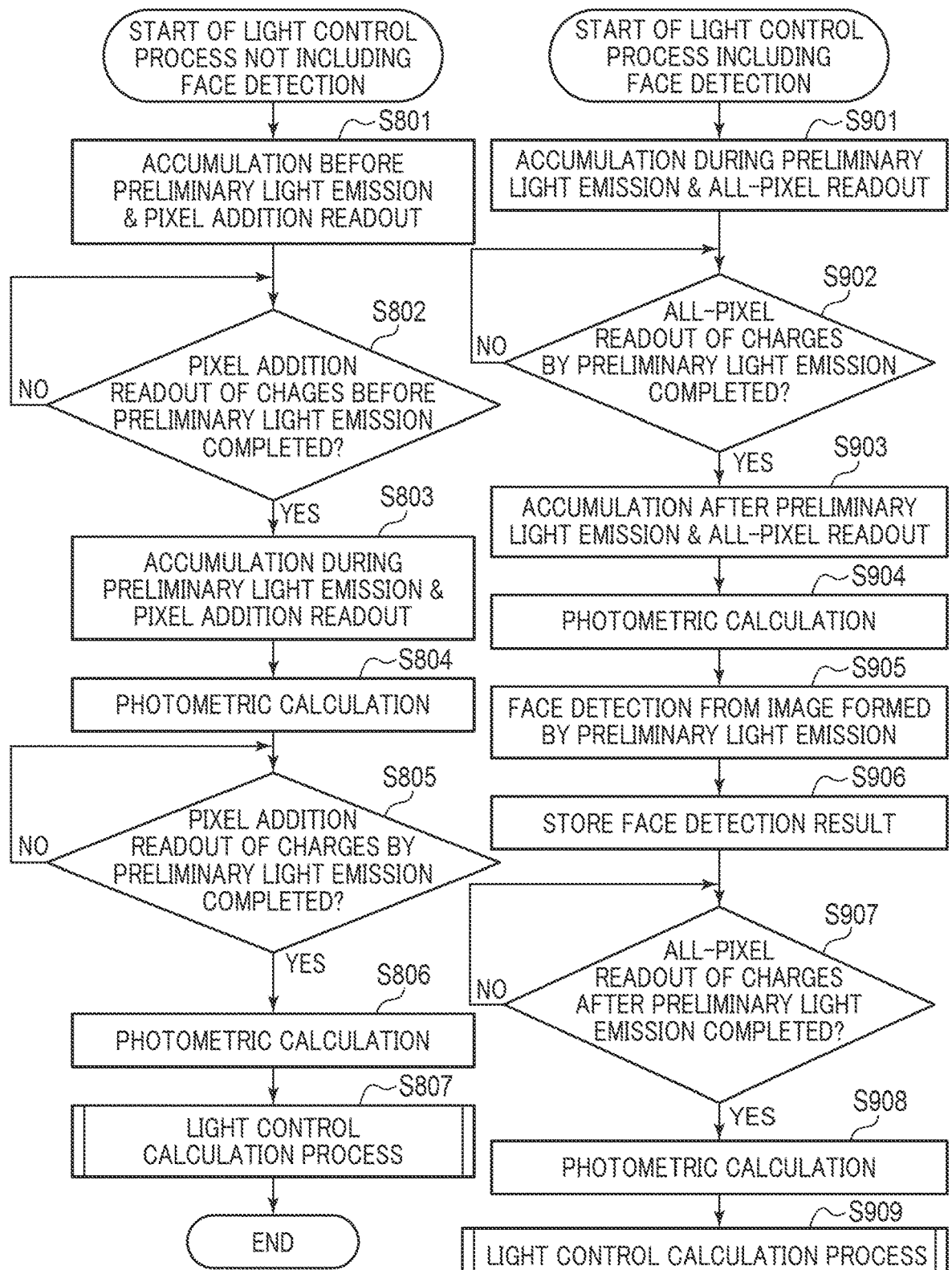

IMAGE PICKUP APPARATUS THAT REDUCES TIME REQUIRED FOR LIGHT CONTROL PROCESSING AND METHOD OF CONTROLLING SAME

BACKGROUND OF THE INVENTION

Field of the Invention

The present invention relates to an image pickup apparatus and a method of controlling the same, and more particularly to an image pickup apparatus that performs photographing by main light emission controlled according to a result of photometry performed by preliminary light emission.

Description of the Related Art

In general, when photographing is performed by an image pickup apparatus, such as a digital camera, a light emission device (referred to as the strobe) is sometimes caused to perform preliminary light emission, so as to control light emission intensity and light emission time for main light emission based on a photometric value obtained by the preliminary light emission.

For example, there has been proposed a method in which a face area of an object is detected from an image obtained by execution of preliminary light emission, and in a case where a light control area set in advance and the detected face area are different from each other, light control is performed with respect to an area with the detected face area in its center (see e.g. Japanese Laid-Open Patent Publication (Kokai) No. 2005-184508).

Further, there has been proposed a method in which when controlling a light emission amount for main light emission based on a photometric value obtained by preliminary light emission, one face area is selected from a plurality of face areas detected by face detection processing, and an amount of light for main light emission is determined based on information concerning the selected face area (see e.g. Japanese Laid-Open Patent Publication (Kokai) No. 2013-42237).

However, in the method described in Japanese Laid-Open Patent Publication (Kokai) No. 2005-184508, the processing for detecting a face area of an object is performed at preliminary light emission, and hence it takes time before executing main light emission.

Further, in the method described in Japanese Laid-Open Patent Publication (Kokai) No. 2013-42237, in a situation in which luminance is insufficient (such as a situation in which a person is photographed with a night scene as a background), it is difficult to accurately detect a face area by preliminary light emission. That is, the detection accuracy of a face area is lowered in a situation in which luminance is insufficient.

SUMMARY OF THE INVENTION

The present invention provides an image pickup apparatus that is capable of reducing time required before main light emission by performing light control according to a situation and a method of controlling the same.

In a first aspect of the present invention, there is provided an image pickup apparatus that photographs an object by causing a light emission device to emit light toward the object, comprising at least one processor that functions, according to at least one program stored in a memory, as units comprising a photometry unit configured to selectively obtain a first image having a first resolution and a second image having a second resolution lower than the first resolution, as a photometric image, and performs photometry using the obtained photometric image to thereby obtain a result of photometry, a determination unit configured to determine whether or not a predetermined condition is satisfied, and a control unit configured to control, when performing light control processing for determining a main light emission amount for causing the light emission device to perform main light emission for photographing the object, the photometry unit to switch between first control in which the light control processing is performed based on the first image and second control in which the light control processing is performed based on the second image, according to a result of determination performed by the determination unit.

In a second aspect of the present invention, there is provided an image pickup apparatus that is capable of performing light emission photographing in which a light emission device is caused to emit light, comprising at least one processor that functions, according to at least one program stored in a memory, as units comprising, a face detection unit configured to perform face detection processing on an image obtained using the image sensor, for detecting a face area from an object, a calculation unit configured to calculate a main light emission amount of the light emission device based on information on the face area detected by the face detection processing, non-light emission image obtained using the image sensor without causing the light emission device to emit light, a preliminary light emission image obtained using the image sensor by causing the light emission device to perform preliminary light emission, and a control unit configured to perform control, in a case where the face detection processing is performed on the preliminary light emission image, such that the non-light emission image is obtained after the preliminary light emission image is obtained.

In a third aspect of the present invention, there is provided a method of controlling an image pickup apparatus that photographs an object by causing a light emission device to emit light toward the object, comprising selectively obtaining a first image having a first resolution and a second image having a second resolution lower than the first resolution, as a photometric image, and performing photometry using the obtained photometric image to thereby obtain a result of photometry, determining whether or not a predetermined condition is satisfied, and switching, when performing light control processing for determining a main light emission amount for causing the light emission device to perform main light emission for photographing the object, between first control in which the light control processing is performed based on the first image and second control in which the light control processing is performed based on the second image, according to a result of determination performed by said determining.

In a fourth aspect of the present invention, there is provided a method of controlling an image pickup apparatus that is capable of performing light emission photographing in which a light emission device is caused to emit light, comprising performing face detection processing on an image obtained using the image sensor, for detecting a face area from an object, calculating a main light emission amount of the light emission device based on information on the face area detected by the face detection processing, non-light emission image obtained using the image sensor without causing the light emission device to emit light, a preliminary light emission image obtained using the image sensor by causing the light emission device to perform preliminary light emission, and controlling, in a case where the face detection processing is performed on the preliminary light emission image, such that the non-light emission image is obtained after the preliminary light emission image is obtained.

According to the present invention, when photographing is performed by causing a light emission device to perform light emission, it is possible to reduce time required before main light emission, by performing light control according to a situation.

Further features of the present invention will become apparent from the following description of exemplary embodiments (with reference to the attached drawings).

BRIEF DESCRIPTION OF THE DRAWINGS

FIGS. 5A to 5C are timing charts useful in explaining a photometry process and light control processes, performed by the camera shown in FIG. 1.

FIGS. 7A and 7B are flowcharts of a light control process not including face detection and a light control process including face detection, performed in respective steps in FIG. 6B.

DESCRIPTION OF THE EMBODIMENTS

The present invention will now be described in detail below with reference to the accompanying drawings showing embodiments thereof.

Figure 1:
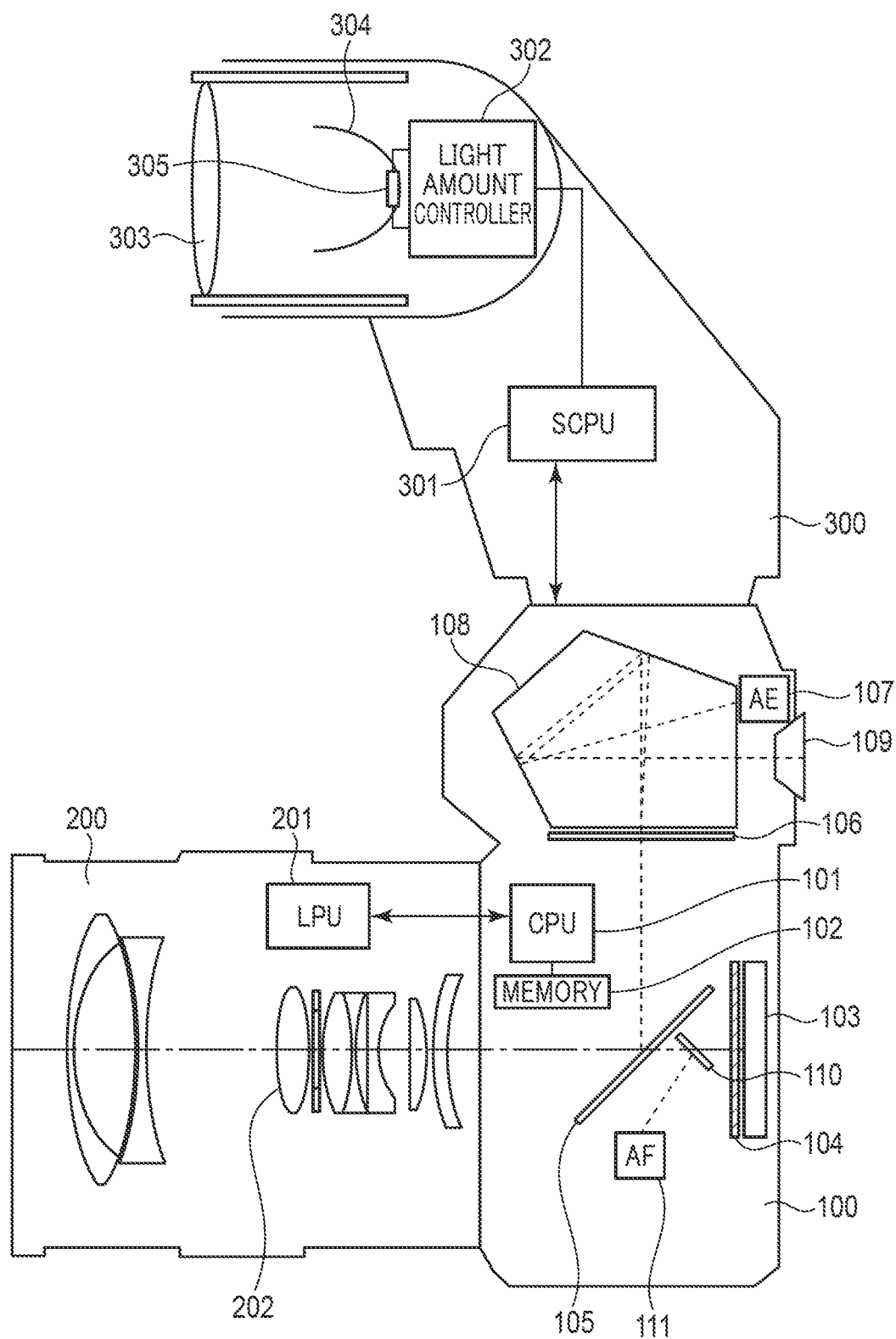
FIG. 1 is a view showing the configuration of a camera as an example of an image pickup apparatus according to a first embodiment of the present invention.

FIG. 1 is a view showing an example of an image pickup apparatus according to a first embodiment of the present invention.

The illustrated image pickup apparatus is e.g. a digital camera (hereinafter simply referred to as the camera), and includes a camera body (image pickup apparatus body) 100 and a photographic lens unit (hereinafter simply referred to as the photographic lens) 200. The photographic lens 200 is removably attached to the camera body 100. Further, a light emission device (hereinafter referred to as the strobe) 300 is attached to the camera body 100.

The camera body 100 includes a CPU 101, and the CPU 101 controls the overall operation of the camera. A memory 102 is connected to the CPU 101, and includes e.g. a RAM and a ROM.

The camera body 100 includes an image pickup device 103, and the image pickup device 103 is a CCD or CMOS image sensor including an infrared cut filter, a lowpass filter, and so forth. When photographing is performed, an object image (optical image) is formed on the image pickup device 103 through the photographic lens 200 as described hereafter, and the image pickup device 103 outputs image signals corresponding to the optical image.

A shutter 104 is disposed on a front side of the image pickup device 103. The shutter 104 shields the image pickup device 103 from light when photographing is not performed, and is controlled to be opened to expose the image pickup device 103 when photographing is performed. Further, a half mirror 105 is disposed forward of the shutter 104. The half mirror 105 is positioned on an optical axis (optical path) of the photographic lens 200 when photographing is not performed, and reflects light incident through the photographic lens 200 to cause an image of the reflected light to be formed on a focusing plate 106.

A pentaprism 108 guides the optical image formed on the focusing plate 106 to a photometric sensor (AE) 107 and an optical viewfinder 109. A user can view the optical image formed on the focusing plate 106 through the optical viewfinder 109. The photometric sensor 107 includes an image pickup device, such as a CCD or CMOS image sensor. The CPU 101 performs object recognition processing, such as photometry processing, face detection, object tracking processing, and light source detection (flicker detection), based on a result of photometry by the photometric sensor 107.

An AF mirror 110 is disposed rearward of the half mirror 105. The AF mirror 110 guides light transmitted through the half mirror 105 to a ranging sensor (AF) 111. The ranging sensor 111 measures a distance based on the received optical image.

Figure 2:
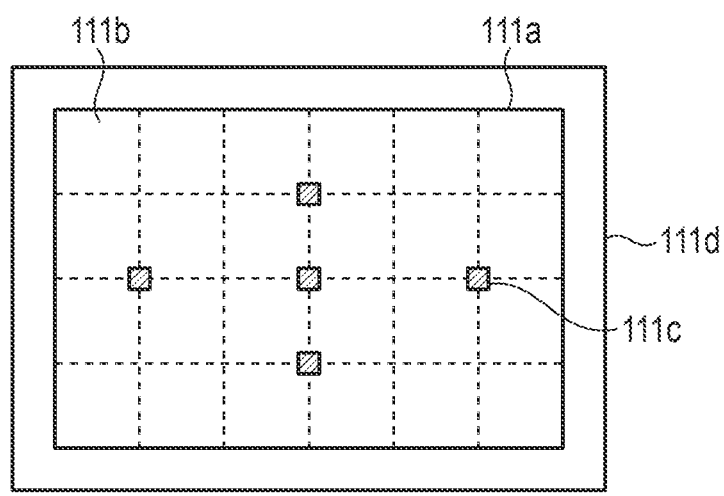
FIG. 2 is a diagram showing an example of arrangement of ranging frames used by a ranging sensor appearing in FIG. 1.

FIG. 2 is a diagram showing an example of arrangement of ranging frames used by the ranging sensor 111 appearing in FIG. 1.

The ranging sensor 111 includes an image pickup device, such as a CCD or CMOS image sensor. The ranging sensor 111 has an image pickup area 111d, and a photometric area 111a is set in the image pickup area 111d. The photometric area 111a is divided into a plurality of photometry blocks 111b. In the illustrated example, the photometric area 111a is divided into 24 photometry blocks 111b. Further, a plurality of ranging frames 111c are set in the photometric area 111a. The CPU 101 performs AF control according to a result of ranging by the ranging sensor 111.

The photographic lens 200 includes a CPU (hereinafter referred to as the LPU) 201 and a lens group 202. The LPU 201 controls driving of the lens group 202 under the control of the CPU 101 to perform e.g. an AF operation. Then, the LPU 201 measures a distance to an object according to the driving of the lens group 202, and sends object distance information indicative of the distance, to the CPU 101.

The strobe 300 includes a CPU (hereinafter referred to as the SCPU) 301, and the SCPU 301 controls the operation of the strobe 300 under the control of the CPU 101. A light amount controller 302 has a booster circuit for boosting a battery voltage so as to light a light source 305, and has an electric current control circuit for controlling the start and stop of light emission, and so forth.

The strobe 300 is provided with a zoom optical system 303, and the zoom optical system 303 includes a panel, such as a Fresnel lens, and changes an irradiation angle of light emitted from the strobe 300. A reflection umbrella 304 is used for collecting light emitted from the light source 305 and irradiating an object with the collected light. As the light source 305, a xenon tube or a white LED is used, for example.

Figure 3:
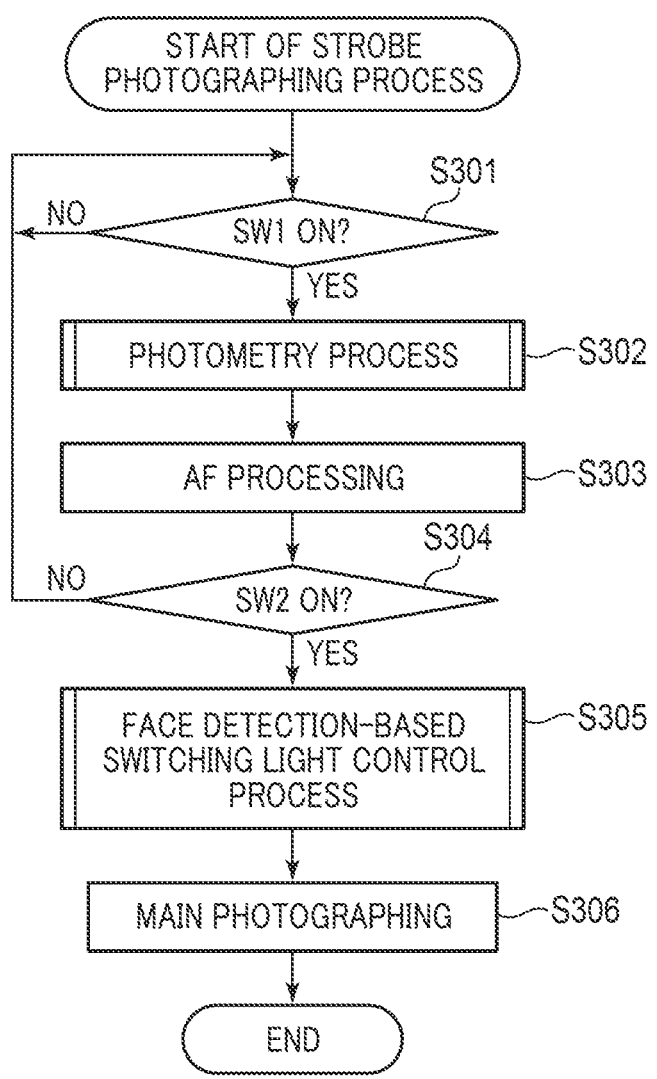
FIG. 3 is a flowchart of a strobe photographing process performed by the camera shown in FIG. 1.

FIG. 3 is a flowchart of a strobe photographing process performed by the camera shown in FIG. 1. Note that in this process, it is assumed that the camera has been powered on and the camera is in a photographing standby state.

First, the CPU 101 determines whether or not a shutter button (not shown) is in a half-pressed state, i.e. a first shutter switch (SW1) is ON (step S301). If the SW1 is OFF (NO to the step S301), the CPU 101 waits.

If the SW1 is ON (YES to the step S301), the CPU 101 performs a photometry process, described hereinafter (step S302). In this step, the CPU 101 drives the photometric sensor 107 to perform photometry processing, face detection processing, and flicker detection processing, based on a result of photometry by the photometric sensor 107.

Then, the CPU 101 performs AF (autofocus) processing using an imaging plane phase difference detection method based on the result of photometry by the photometric sensor 107 and a result of ranging by the ranging sensor 111 (step S303). In this step, for example, based on a face area of an object detected by the face detection processing performed based on the result of photometry by the photometric sensor 107, the CPU 101 controls the ranging sensor 111 to detect a defocus amount at a ranging point where the face area is positioned. The CPU 101 performs AF control by causing the LPU 201 to drive a focus lens included in the lens group 202 according to the detected defocus amount.

Next, the CPU 101 determines whether or not the shutter button is in a fully-pressed state, i.e. a second shutter switch (SW2) is ON (step S304). If the SW2 is OFF (NO to the step S304), the CPU 101 returns to the step S301.

If the SW2 is ON (YES to the step S304), the CPU 101 drives the photometric sensor 107 and the strobe 300 to perform a face detection-based switching light control process, described hereinafter, to thereby determine an amount of light emission (main light emission amount) for final light emission (main light emission) (step S305). After that, the CPU 101 performs image pickup processing (final photographing) based on an exposure control value determined in the step S302 and the main light emission amount determined in the step S305 (step S306). Then, the CP 101 terminates the strobe photographing process.

Figure 4A:
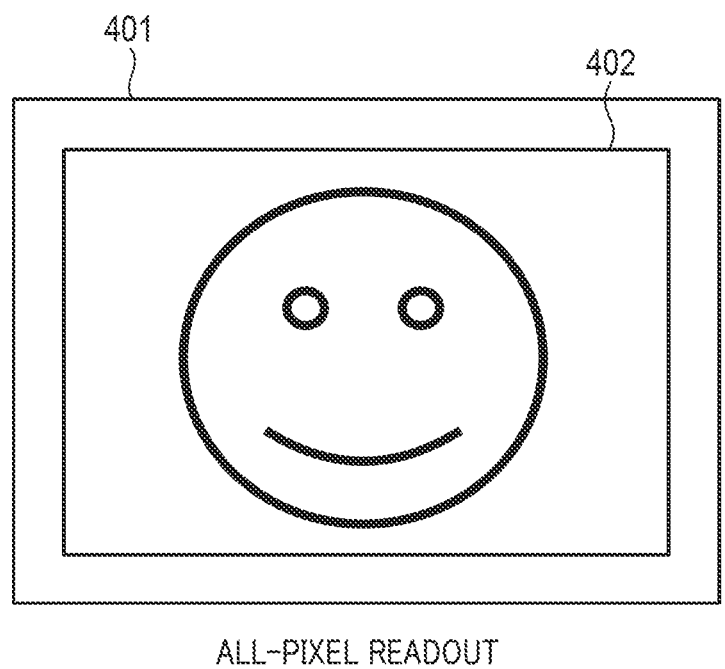
FIGS. 4A and 4B are diagrams useful in explaining driving of a photometric sensor appearing in FIG. 1.
Figure 4B:
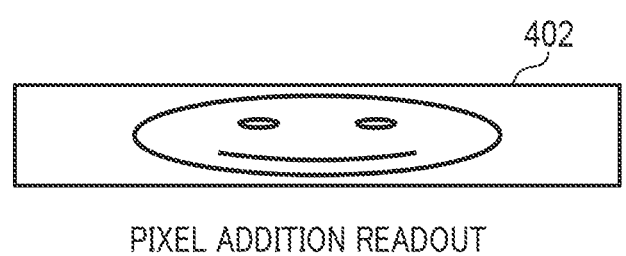

FIGS. 4A and 4B are diagrams useful in explaining driving of the photometric sensor appearing in FIG. 1, in which FIG. 4A shows an image obtained by all-pixel readout driving, and FIG. 4B shows an image obtained by pixel addition readout driving.

As shown in FIG. 4A, an image pickup area 401 is defined in the photometric sensor 107, and a photometric area 402 is set in the image pickup area 401. In all-pixel readout driving, all pixels existing in the photometric area 402 are read out, and as a result, an image formed in the photometric area 402 is output from the photometric sensor 107. Therefore, an image having a high resolution (first image) is obtained, and hence although the accuracy of the face detection processing is high, a readout time for obtaining the image is long.

On the other hand, in pixel addition readout driving, pixels existing in the photometric area 402 are added and read out, and hence a compressed image having a low resolution (second image) is output from the photometric sensor 107. However, a readout time for obtaining the image is short. In short, the photometric sensor 107 selectively outputs the first image and the second image.

FIGS. 5A to 5C are timing charts useful in explaining the photometry process and the light control processes, performed by the camera shown in FIG. 1, in which FIG. 5A shows the photometry process, FIG. 5B shows the light control process not including face detection, and FIG. 5C shows the light control process including face detection.

Referring to FIG. 5A, in the photometry process, first, the CPU 101 drives the photometric sensor 107 to perform photometry accumulation processing. Then, the CPU 101 performs all-pixel readout processing of charges accumulated for photometry from the photometric sensor 107 to thereby obtain an images (all-pixel image for photometry), and stores the obtained image in the memory 102. Then, the CPU 101 performs photometric calculation and face detection processing using the all-pixel image for photometry.

The photometric calculation refers to processing for determining a brightness of the photometric area. For example, the photometric area 402 is divided into a plurality of block areas, and the CPU 101 determines a brightness on a block area-by-block area basis. Then, the CPU 101 calculates the brightness of the whole photometric area 402 based on the brightnesses of the block areas. Further, in the face detection processing, the CPU 101 detects a face area of an object by performing pattern matching analysis processing with respect to the all-pixel image for photometry. Note that the above-mentioned photometric calculation and face detection processing are already known, and hence detailed description thereof is omitted.

Upon completion of readout of the all-pixel image for photometry, the CPU 101 drives the photometric sensor 107, for flicker accumulation, so as to determine the period of so-called flicker of a fluorescent light or the like which repeats blinking. Then, the CPU 101 performs flicker pixel addition readout processing of charges accumulated for flicker detection from the photometric sensor 107 to thereby obtain a flicker pixel-added image, and stores the obtained image in the memory 102. At this time, the flicker accumulation by the photometric sensor 107 and the flicker pixel addition readout from the photometric sensor 107 are performed in parallel with the photometric calculation and the face detection processing by the CPU 101.

After performing the photometric calculation and the face detection processing, the CPU 101 performs flicker detection calculation using the flicker pixel-added image, and determines whether flicker occurs and the period of flicker. In the flicker detection calculation, for example, a plurality of added pixel images are continuously captured by reducing the accumulation time, and the CPU 101 determines the period of flicker and the like based on the images. Note that this flicker detection calculation is already known, and hence detailed description thereof is omitted.

Then, referring to FIG. 5B, in the light control process not including face detection, first, the CPU 101 drives the photometric sensor 107 to perform accumulation processing before preliminary light emission. Then, the CPU 101 performs pixel addition readout to thereby obtain an added-pixel image of charges accumulated before preliminary light emission from the photometric sensor 107, and stores the obtained image in the memory 102. After that, the CPU 101 performs photometric calculation using the stored added-pixel image of charges accumulated before preliminary light emission to obtain an object luminance before preliminary light emission.

Upon completion of pixel addition readout before preliminary light emission, the CPU 101 causes the strobe 300 to perform preliminary light emission and drives the photometric sensor 107 to perform accumulation processing during preliminary light emission. Then, the CPU 101 performs pixel addition readout processing of charges accumulated during preliminary light emission from the photometric sensor 107 to obtain an added-pixel image of charges accumulated during preliminary light emission, and stores the obtained image in the memory 102. Note that the preliminary light emission by the strobe 300, the accumulation processing during preliminary light emission and the pixel addition readout processing of charges accumulated during preliminary light emission by the photometric sensor 107, and the photometric calculation based on the added-pixel image of charges accumulated before preliminary light emission by the CPU 101, are performed in parallel.

After the photometric calculation, the CPU 101 performs photometric calculation using the added-pixel image of charges accumulated during preliminary light emission, and determines an object luminance during preliminary light emission. Then, the CPU 101 performs light control calculation for determining the main light emission amount.

As described above, in the light control processing not including face detection, since face detection is not performed, it is possible to reduce the time required for light control processing.

Referring to FIG. 5C, in the light control process including face detection, first, the CPU 101 causes the strobe 300 to perform preliminary light emission, and drives the photometric sensor 107 to perform accumulation processing during preliminary light emission. Then, the CPU 101 stores an all-pixel image of charges accumulated during preliminary light emission obtained by all-pixel readout from the photometric sensor 107, in the memory 102. The CPU 101 performs photometric calculation using the all-pixel image of charges accumulated during preliminary light emission to thereby obtain an object luminance during preliminary light emission.

Next, the CPU 101 performs face detection processing, and detects a face of an object from the all-pixel image of charges accumulated during preliminary light emission. By using the all-pixel image of charges accumulated during preliminary light emission, it is possible to detect a face area of the object with high accuracy even under a dark environment.

Upon completion of all-pixel image readout processing of charges accumulated during the preliminary light emission, the CPU 101 drives the photometric sensor 107 to perform accumulation processing after preliminary light emission. Then, the CPU 101 stores an all-pixel image of charges accumulated after preliminary light emission obtained by all-pixel readout, in the memory 102.

Here, the accumulation processing after preliminary light emission and the all-pixel readout processing after preliminary light emission by the photometric sensor 107 are performed in parallel with and are terminated simultaneously with the photometric calculation and the face detection processing based on the all-pixel image of charges accumulated during preliminary light emission by the CPU 101. Note that in a case where the accuracy of the face detection processing is increased, the face detection processing may be performed after the all-pixel readout processing after preliminary light emission.

After performing the photometric calculation and the face detection processing, the CPU 101 performs photometric calculation using the all-pixel image of charges accumulated after preliminary light emission to thereby obtain an object luminance after preliminary light emission. Then, the CPU 101 performs light control calculation for the purpose of determining the main light emission amount. Note that in this light control process, the face area is taken into account as described hereinafter.

As described above, in the light control process including face detection, the accumulation processing during preliminary light emission and the all-pixel readout processing of charges accumulated during preliminary light emission are performed first, and the face detection processing is performed in parallel with the accumulation processing after preliminary light emission and the all-pixel readout after preliminary light emission. This makes it possible to increase the accuracy of face detection and also reduce the time required to perform the light control process.

Figure 6A:
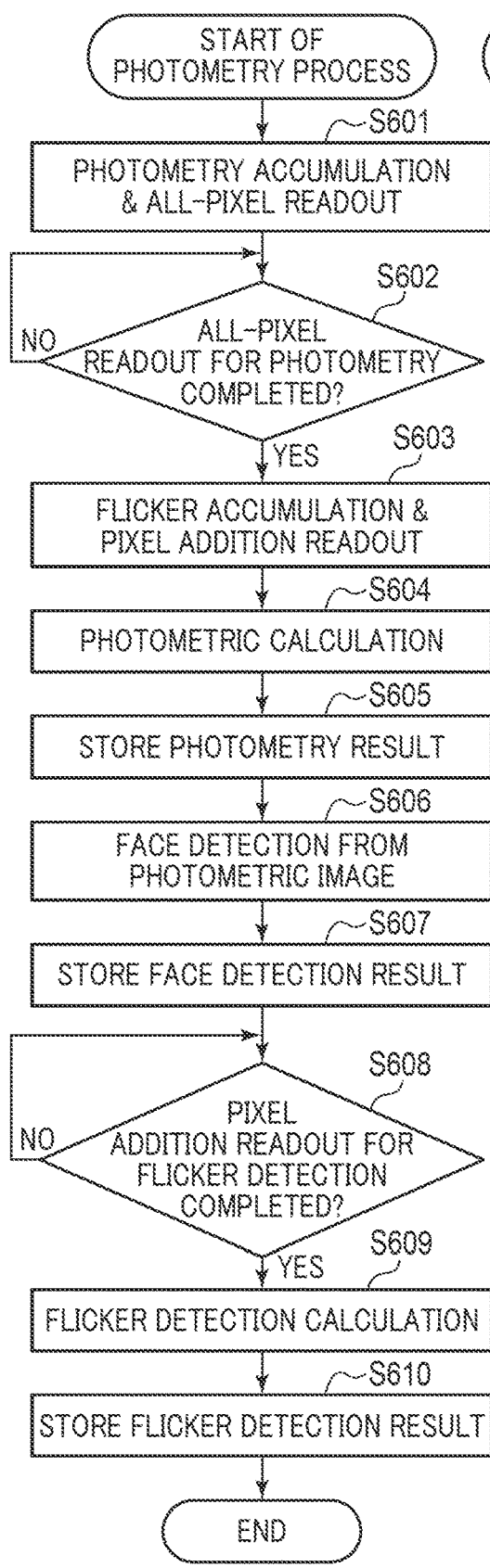
FIGS. 6A and 6B are flowcharts of a photometry process and a face detection-based switching light control process, performed in respective steps in FIG. 3.
Figure 6B:
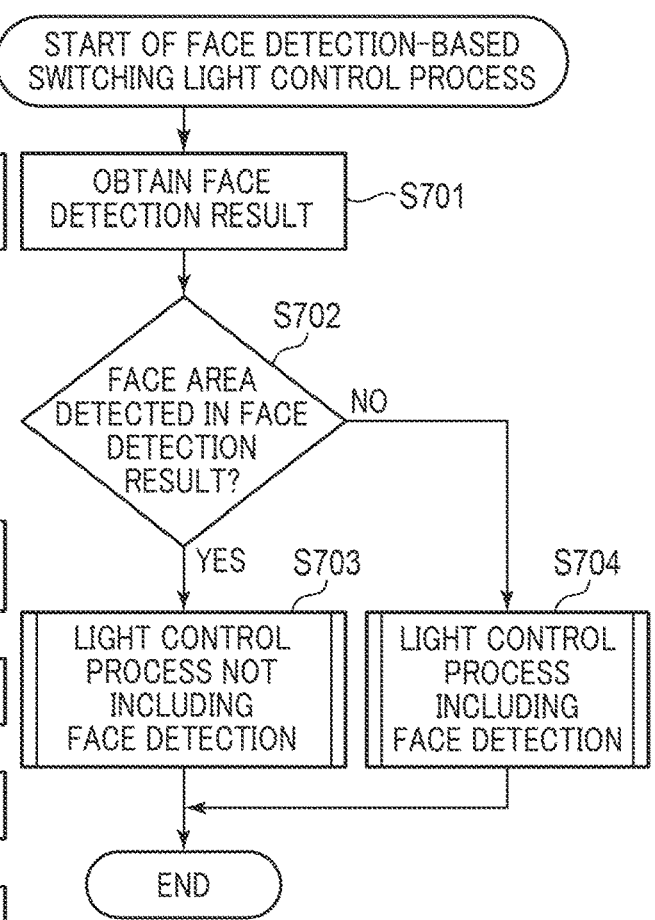

FIGS. 6A and 6B are flowcharts of the photometry process and the face detection-based switching light control process, performed in FIG. 3, in which FIG. 6A shows the photometry process and FIG. 6B shows the face detection-based switching light control process.

First, referring to FIG. 6A, at the start of the photometry process, the CPU 101 drives the photometric sensor 107 to perform accumulation processing for photometry and all-pixel readout processing (step S601). Then, if the all-pixel readout processing for photometry is not completed (NO to a step S602), the CPU 101 waits.

If the all-pixel readout processing of charges accumulated for photometry is completed (YES to the step S602), the CPU 101 causes the photometric sensor 107 to perform flicker accumulation processing and pixel addition readout processing (step S603). Then, the CPU 101 performs photometric calculation processing using an all-pixel image of charges accumulated for photometry, obtained in the step S601 (step S604).

Then, the CPU 101 stores a result of photometry in the step S604, in the memory 102 (step S605). Then, the CPU 101 performs face detection processing (photometric image-based face detection processing) using the all-pixel image of charges accumulated for photometry (step S606).

Next, the CPU 101 stores a result of the face detection processing, obtained in the step S606, in the memory 102 (step S607). Then, the CPU 101 determines whether or not the pixel addition readout processing of charges accumulated for flicker detection in the step S603 is completed (step S608). If the pixel addition readout processing of charges accumulated for flicker detection is not completed (NO to the step S608), the CPU 101 waits.

If the pixel addition readout processing of charges accumulated for flicker detection is completed (YES to the step S608), the CPU 101 performs flicker detection calculation processing using an added-pixel image of charges accumulated for flicker detection, obtained in the step S603 (step S609). Then, the CPU 101 stores a result of the flicker detection, obtained in the step S609, in the memory 102 (step S610). Then, the CPU 101 terminates the present process.

Referring to FIG. 6B, at the start of the face detection-based switching light control process, the CPU 101 obtains a result of the face detection, obtained in the step S606 (step S701). Then, the CPU 101 determines whether or not a face area has been detected, by consulting the result of the face detection, and obtains a result of the determination (step S702).

If the result of the determination indicates that a face area has been detected (YES to the step S702), i.e. if a predetermined condition is satisfied, the CPU 101 performs the light control process not including face detection (step S703). Then, the CPU 101 terminates the face detection-based switching light control process. On the other hand, if no face area has been detected (NO to the step S702), the CPU 101 performs the light control process including face detection (step S704). Then, the CPU 101 terminates the face detection-based switching light control process.

As described above, whether or not to perform the face detection processing in the light control is switched according to a result of the face detection in the photometry process, and hence it is possible to reduce the time required to perform light control processing, while improving the accuracy of face detection.

FIGS. 7A and 7B are flowcharts of the light control process not including face detection and the light control process including face detection, performed in FIG. 6B, in which FIG. 7A shows the light control process not including face detection, and FIG. 7B shows the light control process including face detection.

First, referring to FIG. 7A, at the start of the light control process not including face detection, the CPU 101 drives the photometric sensor 107 to perform accumulation processing before preliminary light emission and pixel addition readout processing (step S801). Then, the CPU 101 determines whether or not the pixel addition readout processing of charges accumulated before preliminary light emission is completed (step S802). If the pixel addition readout processing of charges accumulated before preliminary light emission is not completed (NO to the step S802), the CPU 101 waits.

If the pixel addition readout processing of charges accumulated before preliminary light emission is completed (YES to the step S802), the CPU 101 drives the strobe 300 and the photometric sensor 107 to perform accumulation processing during preliminary light emission and pixel addition readout processing (step S803). Then, the CPU 101 performs photometric calculation using an added-pixel image of charges accumulated before preliminary light emission, and stores a result of photometry by the photometric calculation in the memory 102 (step S804).

Then, the CPU 101 determines whether or not the pixel addition readout processing of charges accumulated during preliminary light emission is completed (step S805). If the pixel addition readout processing of charges accumulated during preliminary light emission is not completed (NO to the step S805), the CPU 101 waits.

On the other hand, if the pixel addition readout processing of charges accumulated during preliminary light emission is completed (YES to the step S805), the CPU 101 performs photometric calculation using an added-pixel image of charges accumulated during preliminary light emission, which has been obtained in the step S803 (step S806). Then, the CPU 101 stores a result of photometry calculated by the photometric calculation, in the memory 102. After that, the CPU 101 performs a light control calculation process for determining the main light emission amount (final light emission amount) (step S807), followed by terminating the present process. Note that in this light control calculation process, the face area is taken into account as will be described hereinafter.

Referring to FIG. 7B, at the start of the light control process including face detection, the CPU 101 drives the strobe 300 and the photometric sensor 107 to perform accumulation processing during preliminary light emission and all-pixel readout processing (step S901). Then, the CPU 101 determines whether or not the all-pixel readout processing of charges accumulated during preliminary light emission is completed (step S902). If the all-pixel readout processing of charges accumulated during preliminary light emission is not completed (NO to the step S902), the CPU 101 waits.

If the all-pixel readout processing of charges accumulated during preliminary light emission is completed (YES to the step S902), the CPU 101 drives the photometric sensor 107 to perform accumulation processing after preliminary light emission and all-pixel readout processing (step S903). Then, the CPU 101 performs photometric calculation using an all-pixel image of charges accumulated during preliminary light emission, obtained in the step S901, and stores a result of photometry calculated by the photometric calculation in the memory 102 (step S904).

Next, the CPU 101 performs face detection processing (face detection based on an image of charges accumulated during preliminary light emission) using the all-pixel image of charges accumulated during preliminary light emission (step S905). Then, the CPU 101 stores a result of the face detection processing, obtained in the step S905, in the memory 102 (step S906).

Then, the CPU 101 determines whether or not the all-pixel readout processing of charges accumulated after preliminary light emission is completed (step S907). If the all-pixel readout processing of charges accumulated after preliminary light emission is not completed (NO to the step S907), the CPU 101 waits.

On the other hand, if the all-pixel readout processing of charges accumulated after preliminary light emission is completed (YES to the step S907), the CPU 101 performs photometric calculation using an all-pixel image of charges accumulated after preliminary light emission, obtained in the step S903 (step S908). Then, the CPU 101 stores a result of photometry calculated by the photometric calculation, in the memory 102. After that, the CPU 101 performs the light control calculation process for determining the main light emission amount (step S909), followed by terminating the present process. Note that in this light control calculation process, the face area is taken into account, as will be described hereinafter.

Figure 8:
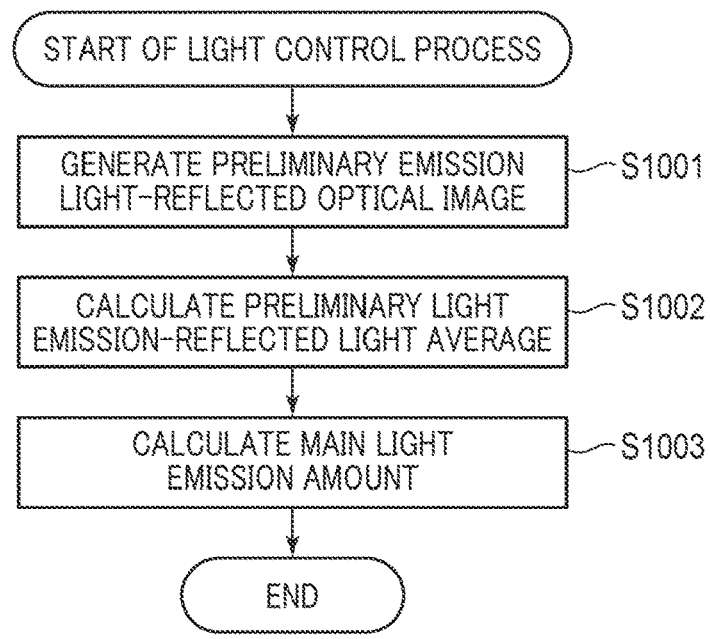
FIG. 8 is a flowchart of a light control calculation process performed in respective steps in FIGS. 7A and 7B.

FIG. 8 is a flowchart of the light control calculation process performed in FIGS. 7A and 7B.

At the start of the light control calculation process, the CPU 101 performs preliminary emission light-reflected optical image generation processing (step S1001). In the light control process not including face detection in FIG. 7A, the CPU 101 obtains a preliminary emission light-reflected optical image by subtracting a result of photometry performed before preliminary light emission from a result of photometry performed during preliminary light emission. On the other hand, in the light control process including face detection in FIG. 7B, the CPU 101 obtains a preliminary emission light-reflected optical image by subtracting a result of photometry performed after preliminary light emission from a result of photometry performed during preliminary light emission. With this, in both the processes, it is possible to obtain an image captured with strobe light by excluding the influence of continuous light. Then, the CPU 101 holds the preliminary emission light-reflected optical image in the memory 102.

Then, the CPU 101 performs preliminary light emission-reflected light averaging calculation using the preliminary emission light-reflected optical image to determine a preliminary light emission-reflected light average value Ys (step S1002). In this step, for example, if the light control mode is a center-weighted light control mode, the CPU 101 sets larger weighting coefficients for photometric areas at and in the vicinity of the center of the image than weighting coefficients for photometric areas at and in the vicinity of peripheral areas of the image.

Let it be assumed that the camera has a characteristic area detection function, and an image pickup mode using the characteristic area detection function is selected. In this case, the CPU 101 sets a larger weighting coefficient for a photometric area corresponding to the characteristic area than those for the other photometric areas. Further, the CPU 101 performs weighting using results of face detection, obtained in the photometry process and the light control process.

Next, the CPU 101 performs final light emission amount calculation (step S1003). In this step, the CPU 101 performs logarithmic transformation on the preliminary light emission-reflected light averaged value Ys by consulting a logarithmic transformation table, set in advance, to thereby obtain a preliminary light emission-reflected light luminance value Ys log after logarithmic transformation. Then, the CPU 101 calculates a difference DF=Ys log−Yt between the preliminary light emission-reflected light luminance value Ys log and a proper luminance value Yt (logarithm). This proper luminance value Yt (logarithm) is a value obtained by converting an exposure value at which proper exposure is obtained in final photographing to a logarithm. The CPU 101 determines a light emission amount in final light emission based on the difference DF (number of steps of difference from a proper light amount in preliminary light emission) and the light emission amount in preliminary light emission. After that, the CPU 101 terminates the present process.

As described above, in the first embodiment of the present invention, when performing strobe photographing, it is possible to reduce the time required before photographing, while improving the accuracy of face detection.

Next, a description will be given of an example of the camera according to a second embodiment of the present invention. Note that the second embodiment differs from the first embodiment in the face detection-based switching light control process described with reference to FIGS. 6A and 6B, and is the same in the configuration of the camera and other processes as the first embodiment.

Figure 9:
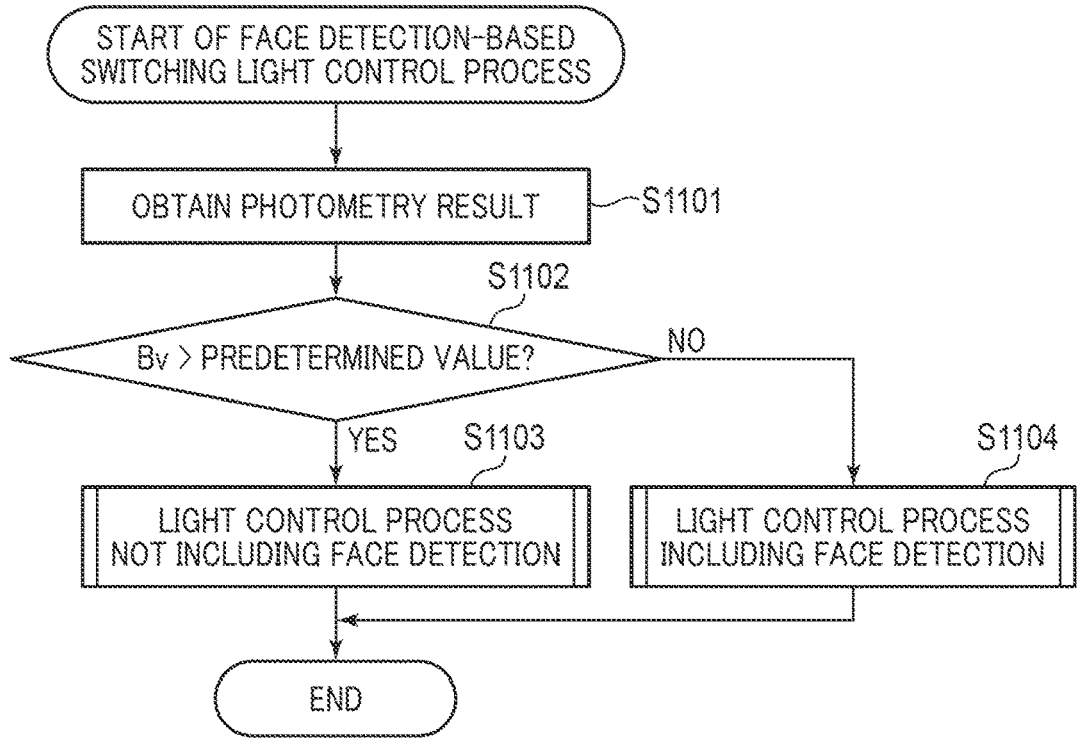
FIG. 9 is a flowchart of a face detection-based switching light control process performed by a camera according to a second embodiment of the present invention.

FIG. 9 is a flowchart of the face detection-based switching light control process performed by the camera according to the second embodiment of the present invention.

First, the CPU 101 performs photometry process as described with reference to FIGS. 6A and 6B, and obtains a result of photometry (step S1101). Then, the CPU 101 determines whether or not a luminance value (Bv value) indicated by the result of photometry is not lower than a predetermined value (e.g. 0) (step S1102). That is, the CPU 101 determines whether or not the luminance of the photometric image is not lower than a predetermined luminance.

If the Bv value is not lower than the predetermined value (YES to the step S1102), the CPU 101 performs the light control process not including face detection, described with reference to FIG. 7A (step S1103). In this step, if the Bv value is not lower than the predetermined value, it is possible to perform face detection in the photometry process with high accuracy without performing face detection based on charges accumulated by preliminary light emission, and hence the light control process not including face detection is performed. Then, the CPU 101 terminates the face detection-based switching light control process.

On the other hand, if the Bv value is lower than the predetermined value (NO to the step S1102), the CPU 101 performs the light control process including face detection, described with reference to FIG. 7B (step S1104). In this step, if the Bv value is lower than the predetermined value, it is not possible to perform face detection in the photometry process with high accuracy, and hence the light control process including face detection is performed. Then, the CPU 101 terminates the present process.

As described above, in the second embodiment of the present invention, the light control process is switched using a result of photometry in the photometry process. This makes it possible, when performing strobe photographing, to reduce the time required before photographing, while improving the accuracy of face detection.

Next, a description will be given of an example of the camera according to a third embodiment of the present invention. Note that the third embodiment differs from the first embodiment in the face detection-based switching light control process described with reference to FIGS. 6A and 6B, and is the same in the configuration of the camera and other processes as the first embodiment.

Figure 10:
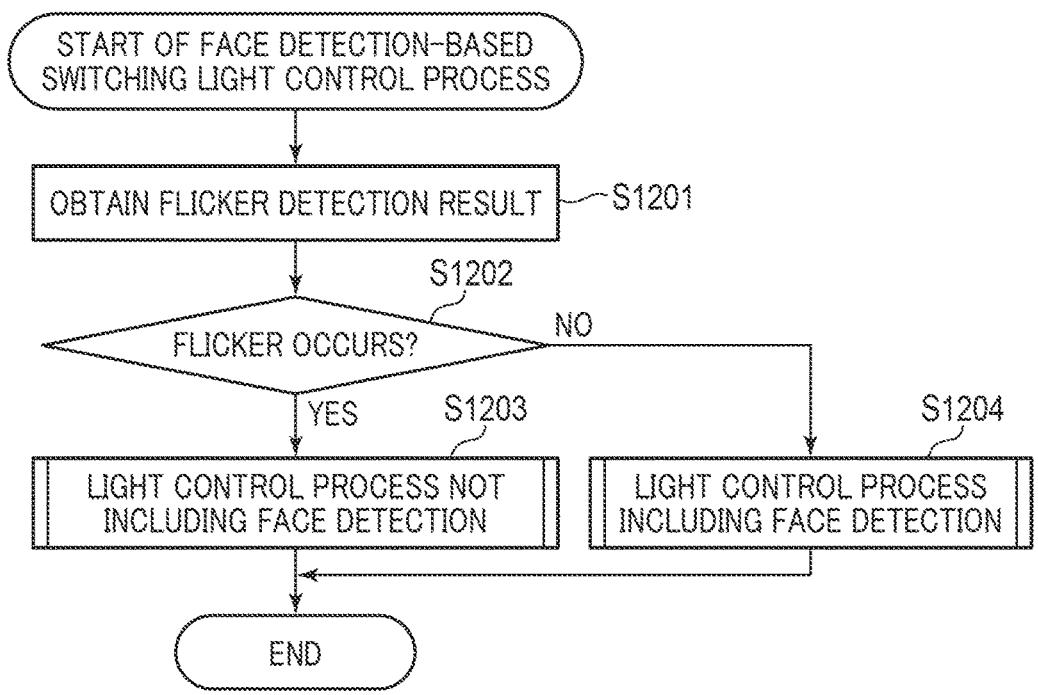
FIG. 10 is a flowchart of a face detection-based switching light control process performed by a camera according to a third embodiment of the present invention.

FIG. 10 is a flowchart of the face detection-based switching light control process performed by the camera according to the third embodiment of the present invention.

First, the CPU 101 performs flicker detection calculation processing and obtains a result of the flicker detection, as described with reference to FIGS. 6A and 6B (step S1201). Then, the CPU 101 determines whether or not flicker occurs according to the result of the flicker detection (step S1202).

If flicker occurs (YES to the step S1202), the CPU 101 performs the light control process not including face detection, described with reference to FIG. 7A (step S1203). In this step, if flicker occurs, the accuracy of face detection by preliminary light emission is reduced, and hence the light control process not including face detection is performed. Then, the CPU 101 terminates the present process.

If flicker does not occur (NO to the step S1202), the CPU 101 performs the light control process including face detection, described with reference to FIG. 7B (step S1204). In this step, if flicker does not occur, the accuracy of face detection by preliminary light emission is not reduced, and hence the light control process including face detection is performed. Then, the CPU 101 terminates the present process.

As described above, in the third embodiment of the present invention, the light control process is switched according to a result of flicker detection. This makes it possible, when performing strobe photographing, to reduce the time required before photographing, while improving the accuracy of face detection.

Next, a description will be given of an example of the camera according to a fourth embodiment of the present invention. Note that the fourth embodiment differs from the first embodiment in the face detection-based switching light control process described with reference to FIGS. 6A and 6B, and is the same in the configuration of the camera and other processes as the first embodiment.

Figure 11:
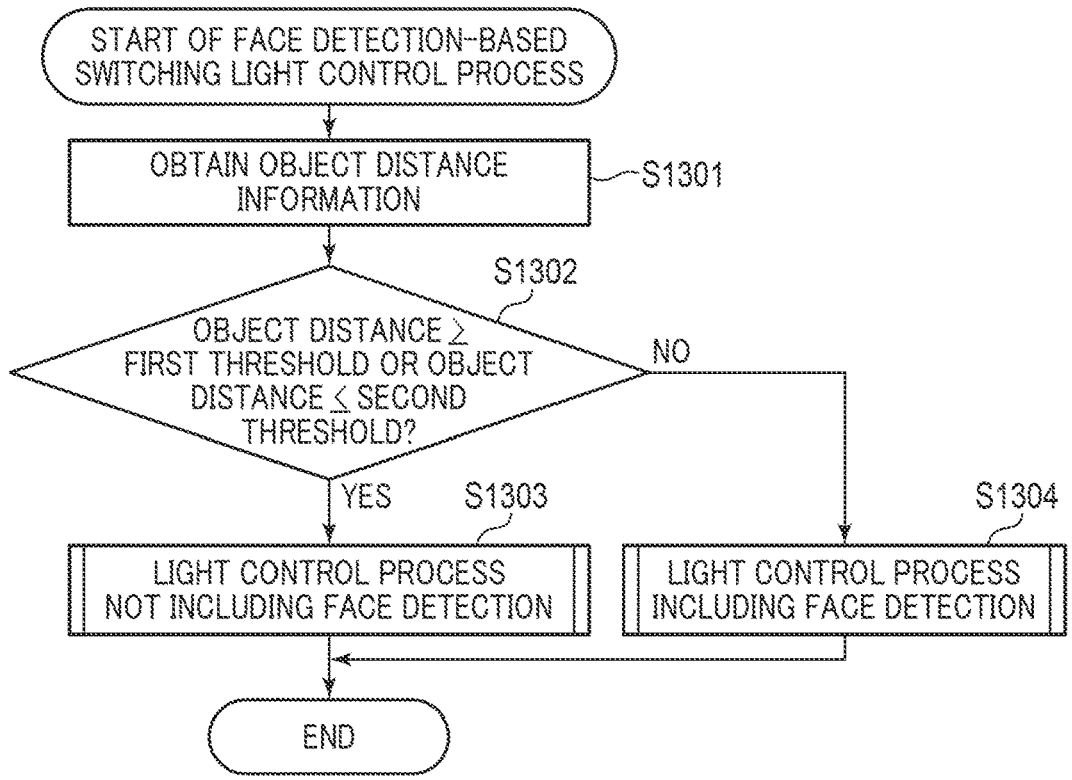
FIG. 11 is a flowchart of a face detection-based switching light control process performed by a camera according to a fourth embodiment of the present invention.

FIG. 11 is a flowchart of the face detection-based switching light control process performed by the camera according to the fourth embodiment of the present invention.

First, the CPU 101 obtains object distance information as in the AF processing described with reference to FIG. 3 (step S1301). Then, the CPU 101 determines whether an object distance indicated by the object distance information is not smaller than a first threshold value or not larger than a second threshold value (step S1302). Note that the first threshold value > the second threshold value holds, and the first threshold value is set e.g. 5 m, and the second threshold value is e.g. 50 cm.

If the object distance is not smaller than the first threshold value or not larger than the second threshold value (YES to the step S1302), the CPU 101 performs the light control process not including face detection, described with reference to FIG. 7A (step S1303). In this step, if the object distance is not smaller than the first threshold value, the distance between the strobe 300 and the object is too large, and light from the strobe 300 does not sufficiently reach the object, and hence the light control process not including face detection is performed. Further, if the object distance is not larger than the second threshold value, the distance between the strobe 300 and the object is too small, which causes object luminance saturation, and hence the light control process not including face detection is performed. Then, the CPU 101 terminates the resent process.

On the other hand, if the object distance is smaller than the first threshold value and also larger than the second threshold value (NO to the step S1302), the CPU 101 performs the light control process including face detection, described with reference to FIG. 7B (step S1304). In this step, if the object distance is smaller than the first threshold value and also larger than the second threshold value, the accuracy of face detection by preliminary light emission is not reduced, and hence the light control process including face detection is performed. Then, the CPU 101 terminates the present process.

As described above, in the fourth embodiment of the present invention, the light control process is switched according to the object distance. This makes it possible, when performing strobe photographing, to reduce the time required before photographing, while improving the accuracy of face detection.

Next, a description will be given of an example of the camera according to a fifth embodiment of the present invention. Note that the fifth embodiment is the same in the configuration of the camera as the first embodiment.

In the camera according to the fifth embodiment, continuous photographing is performed by light emission from the strobe 300, and face detection is performed at this time. In the following description, the photographing process performed in the fifth embodiment is referred to as the face detection-based continuous strobe photographing process.

Figure 12:
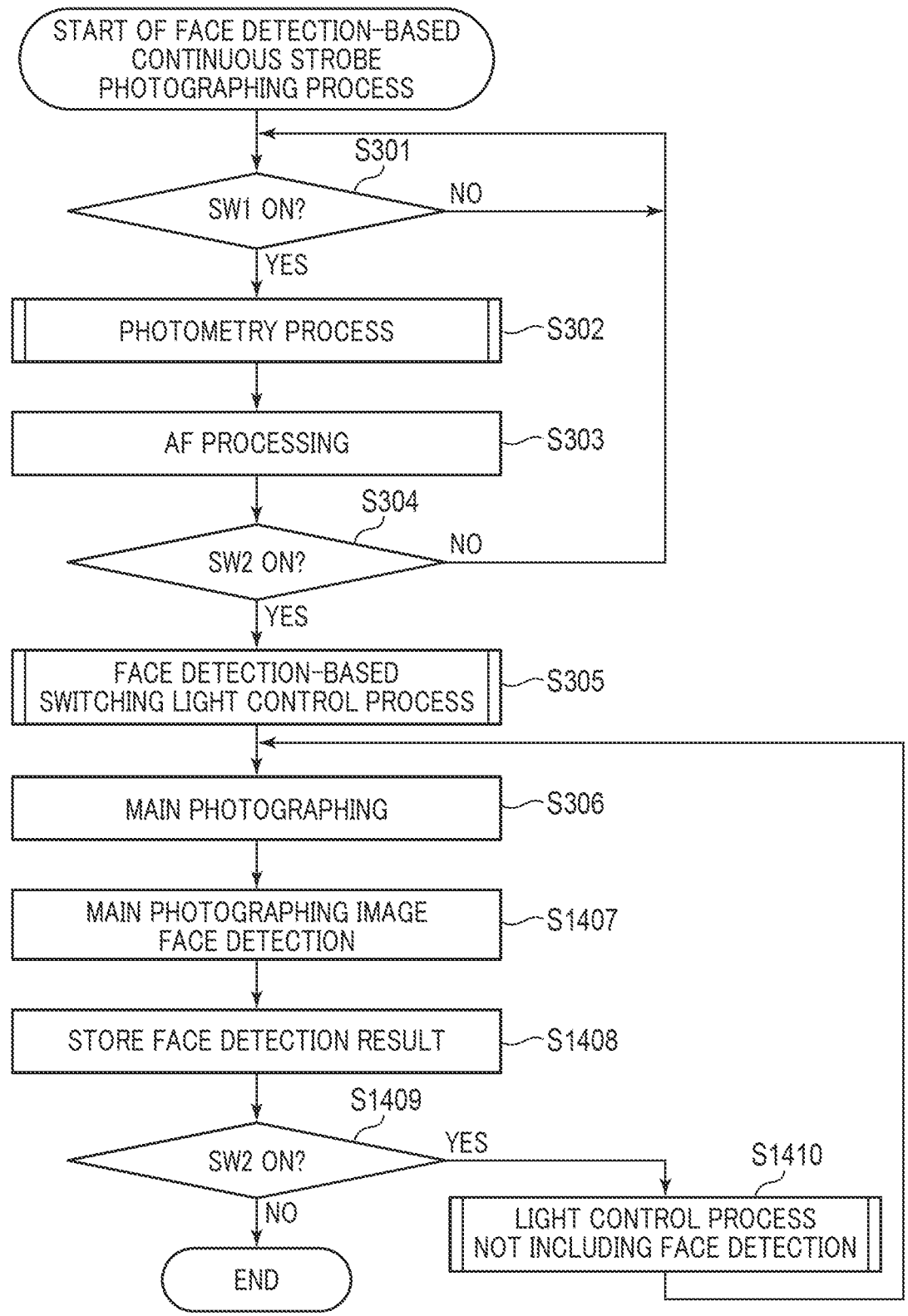
FIG. 12 is a flowchart of a face detection-based continuous strobe photographing process performed by a camera according to a fifth embodiment of the present invention.

FIG. 12 is a flowchart of the face detection-based continuous strobe photographing process performed by the camera according to the fifth embodiment of the present invention. Note that the same steps in FIG. 12 as those in FIG. 3 are denoted by the same step numbers, and description thereof is omitted.

After execution of the step S306, the CPU 101 performs final photographing image face detection processing for detecting a face area in an image obtained by the image pickup device 103 (step S1407). Then, the CPU 101 stores a result of the face detection processing, obtained in the step S1407, in the memory 102 (step S1408).

Then, the CPU 101 determines whether or not the SW2 is ON (step S1409). If the SW2 is OFF (NO to the step S1409), the CPU 101 terminates the present process.

On the other hand, if the SW2 is ON (YES to the step S1409), the CPU 101 performs the light control process not including face detection (step S1410). Then, the CPU 101 returns to the step S306.

As described above, in the fifth embodiment of the present invention, when the SW2 continues to be ON, i.e. when continuous photographing is performed, a result of face detection using the image formed by final photographing is used, and face detection processing is not performed in the light control process. In other words, after a first image is photographed, when photographing a second image successively after the first image, the CPU 101 determines whether or not a predetermined condition is satisfied, such as a condition that a face area has been detected from the first image. This makes it possible, when performing strobe continuous photographing, to reduce the time required before photographing, while improving the accuracy of face detection.

Next, a description will be given of an example of the camera according to a sixth embodiment of the present invention. Note that the sixth embodiment is the same in the configuration of the camera as the first embodiment. Further, the sixth embodiment differs from the first embodiment in the light control process not including face detection and the light control process including face detection, described with reference to FIGS. 5B and 5C, and is the same in the other processes as the first embodiment.

Figure 13A:
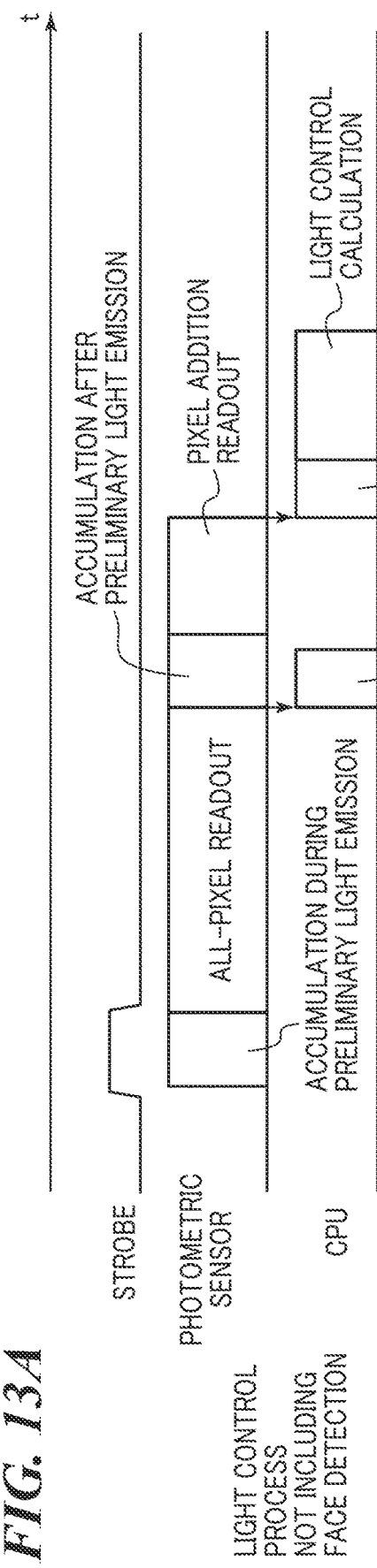
FIGS. 13A and 13B are timing charts useful in explaining light control processes performed by a camera according to a sixth embodiment of the present invention.
Figure 13B:
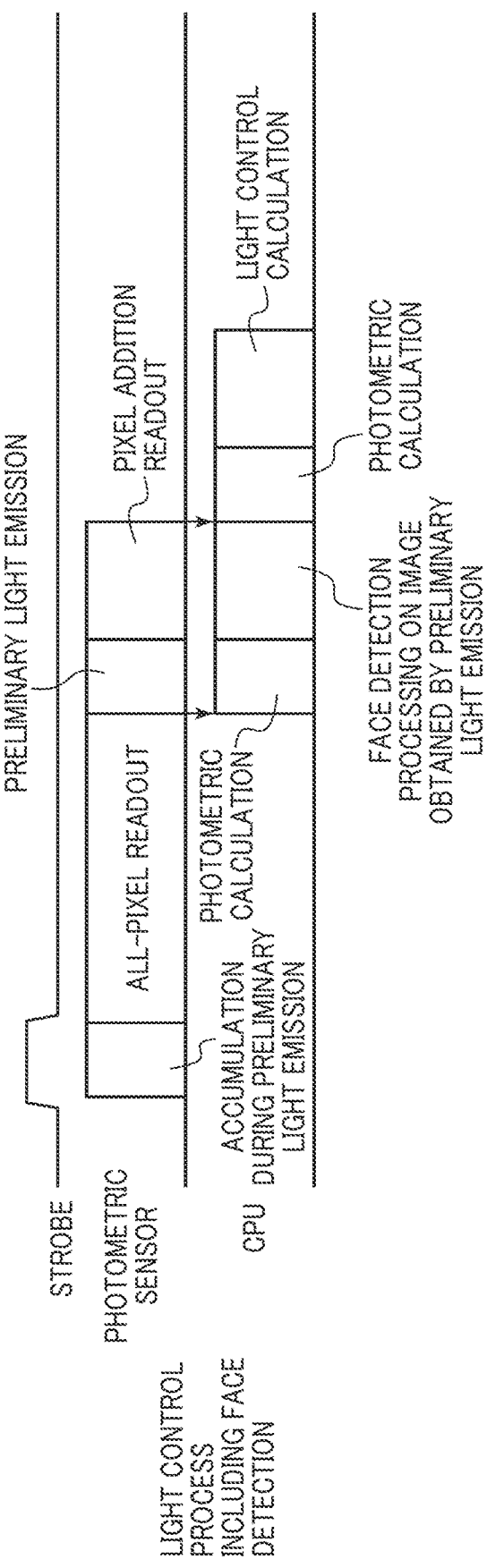

FIGS. 13A and 13B are timing charts useful in explaining the light control processes performed in the sixth embodiment of the present invention, in which FIG. 13A shows the light control process not including face detection, and FIG. 13B shows the light control process including face detection.

First, referring to FIG. 13A, in the light control process not including face detection, the CPU 101 causes the strobe 300 to perform preliminary light emission, and drives the photometric sensor 107 to perform the accumulation processing during preliminary light emission. Then, the CPU 101 performs all-pixel readout to thereby obtain an all-pixel image of charges accumulated during preliminary light emission from the photometric sensor 107, and stores the obtained image in the memory 102. After that, the CPU 101 performs photometric calculation using the all-pixel image of charges accumulated during preliminary light emission to determine an object luminance during preliminary light emission.

Upon completion of the all-pixel readout processing of charges accumulated during preliminary light emission, the CPU 101 drives the photometric sensor 107 to perform accumulation processing after preliminary light emission. Then, the CPU 101 performs pixel addition readout to thereby obtain an added-pixel image of charges accumulated after preliminary light emission from the photometric sensor 107, and stores the obtained image in the memory 102. Note that the accumulation processing after preliminary light emission, the pixel addition readout processing after preliminary light emission, and the photometric calculation using the all-pixel image of charges accumulated during preliminary light emission are performed in parallel.

After performing the photometric calculation using the all-pixel image of charges accumulated during preliminary light emission, the CPU 101 performs photometric calculation using the added-pixel image of charges accumulated after preliminary light emission to determine an object luminance after preliminary light emission.

Then, the CPU 101 performs light control calculation for determining a main light emission amount. In this light control calculation, the light control calculation is performed, by taking the face area of the object into account. The all-pixel image of charges accumulated during preliminary light emission and the added-pixel image of charges accumulated after preliminary light emission are different in image size, and hence a result of the photometric calculation obtained by using the all-pixel image of charges accumulated during preliminary light emission is thinned to a size matching with the added-pixel image of charges accumulated after preliminary light emission. Then, the CPU 101 obtains a preliminary emission light-reflected optical image as described above.

As described above, in the light control process not including face detection in FIG. 13A, face detection is not performed using the all-pixel image of charges accumulated during preliminary light emission, and the pixel addition readout processing is performed after preliminary light emission, and hence it is possible to reduce the time required for the light control process.

Referring to FIG. 13B, in the light control process including face detection, first, the CPU 101 causes the strobe 300 to perform preliminary light emission, and drives the photometric sensor 107 to perform the accumulation processing during preliminary light emission. Then, the CPU 101 stores an all-pixel image of charges accumulated during preliminary light emission obtained from the photometric sensor 107 as a result of all-pixel readout processing, in the memory 102. The CPU 101 performs photometric calculation using the all-pixel image of charges accumulated during preliminary light emission to determine an object luminance during preliminary light emission.

Then, the CPU 101 performs face detection processing, and detects a face of an object from the all-pixel image of charges accumulated during preliminary light emission. By using the all-pixel image of charges accumulated during preliminary light emission, it is possible to detect a face area of an object with high accuracy even under a dark environment.

Upon completion of the all-pixel readout processing of charges accumulated during preliminary light emission, the CPU 101 drives the photometric sensor 107 to perform the accumulation processing after preliminary light emission. Then, the CPU 101 stores an added-pixel image of charges accumulated after preliminary light emission obtained by pixel addition readout processing, in the memory 102.

Here, the accumulation processing and the pixel addition readout processing, performed after preliminary light emission by the photometric sensor 107, and the photometric calculation and the face detection processing based on the all-pixel image of charges accumulated during preliminary light emission, performed by the CPU 101, are performed in parallel, and simultaneously terminated. Note that in a case where the accuracy of the face detection processing is increased, the face detection processing may be performed after the pixel addition readout processing after preliminary light emission.

The CPU 101 performs the photometric calculation and the face detection using the all-pixel image of charges accumulated during preliminary light emission, and then performs the photometric calculation using the added-pixel image of charges accumulated after preliminary light emission to thereby determine an object luminance after preliminary light emission. Then, the CPU 101 performs light control calculation for determining a main light emission amount.

Although in the above-described light control process, the face area of the object is taken into account, the all-pixel image of charges accumulated during preliminary light emission and the added-pixel image of charges accumulated after preliminary light emission are different in image size, and hence a result of the photometric calculation obtained by using the all-pixel image of charges accumulated during preliminary light emission is thinned to a size matching with the added-pixel image of charges accumulated after preliminary light emission. Then, the CPU 101 obtains a preliminary emission light-reflected optical image as described above.

As described above, in the light control process including face detection in FIG. 13B, the face detection processing is performed using the all-pixel image of charges accumulated during preliminary light emission, and the pixel addition readout processing after preliminary light emission is performed in parallel with this. This makes it possible to reduce the time required for the light control process.

As described above, in the embodiments of the present invention, it is possible to detect a face area with high accuracy in strobe photographing, and reduce time required before main light emission.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-072584 filed Apr. 4, 2018, which is hereby incorporated by reference herein in its entirety.

What is claimed is:

1. An image pickup apparatus that photographs an object by causing a light emission device to emit light toward the object, the image pickup apparatus comprising:
   at least one memory configured to store instructions; and
   at least one processor configured to execute the instructions stored in the at least one memory to thereby implement:
   a photometry unit configured to selectively obtain a first image having a first resolution and a second image having a second resolution lower than the first resolution, as a photometric image, and performs photometry using the obtained photometric image to thereby obtain a result of photometry;
   a determination unit configured to determine whether or not a predetermined condition is satisfied; and
   a control unit configured to control, when performing light control processing for determining a main light emission amount for causing the light emission device to perform main light emission for photographing the object, the photometry unit to switch between first control in which the light control processing is performed based on the first image and second control in which the light control processing is performed based on the second image, according to a result of determination performed by the determination unit.

2. The image pickup apparatus according to claim 1, wherein the photometry unit includes an image pickup device having a plurality of pixels,
   wherein the first image is an image obtained by reading all pixels of the image pickup device, and
   wherein the second image is an image read by performing addition processing on the pixels of the image pickup device.

3. The image pickup apparatus according to claim 1, wherein in a case where a predetermined area of the object is detected from the photometric image, the determination unit determines that the predetermined condition is satisfied.

4. The image pickup apparatus according to claim 3, wherein after a first-taken image has been photographed, when a second-taken image is photographed after the first-taken image, the control unit controls the determination unit to determine whether or not the predetermined condition is satisfied in the first-taken image.

5. The image pickup apparatus according to claim 4, wherein the control unit performs the second control in the light control processing performed for photographing the second-taken image.

6. The image pickup apparatus according to claim 3, wherein in a case where it is determined by the determination unit that the predetermined condition is satisfied, the control unit controls the photometry unit to perform processing for obtaining the first image during preliminary light emission by the light emission device and obtaining a first photometry result by performing photometry using the first image obtained during the preliminary light emission, and further perform processing for obtaining the second image after the preliminary light emission by the light emission device and obtaining a second photometry result by performing photometry using the second image obtained after the preliminary light emission, and determines the main light emission amount for causing the light emission device to perform the main light emission based on the first photometry result and the second photometry result.

7. The image pickup apparatus according to claim 6, wherein in a case where it is determined by the determination unit that the predetermined condition is not satisfied, the control unit detects the predetermined area using the first image obtained during the preliminary light emission.

8. The image pickup apparatus according to claim 1, wherein in a case where a luminance of the photometric image is not lower than a predetermined luminance, the determination unit determines that the predetermined condition is satisfied.

9. The image pickup apparatus according to claim 1, wherein in a case where flicker is detected from the photometric image, the determination unit determines that the predetermined condition is satisfied.

10. The image pickup apparatus according to claim 1, wherein the at least one processor is configured to execute the instructions stored in the at least one memory to further implement a measurement unit configured to measure a distance between the image pickup apparatus and the object to obtain distance information, and
wherein in a case where a distance indicated by the distance information obtained by the measurement unit is within a predetermined range, the determination unit determines that the predetermined condition is satisfied.

11. The image pickup apparatus according to claim 1, wherein in a case where it is determined by the determination unit that the predetermined condition is satisfied, the control unit performs the second control.

12. The image pickup apparatus according to claim 11, wherein in the second control, the control unit controls the photometry unit before preliminary light emission by the light emission device to perform processing for obtaining the second image before the preliminary light emission and obtaining a first photometry result by performing photometry using the second image obtained before the preliminary light emission, controls the photometry unit during the preliminary light emission by the light emission device to perform processing for obtaining the second image during the preliminary light emission and obtaining a second photometry result by performing photometry using the second image obtained during the preliminary light emission, and determines the main light emission amount for causing the light emission device to perform the main light emission based on the first photometry result and the second photometry result.

13. The image pickup apparatus according to claim 12, wherein the control unit performs the processing for obtaining the first photometry result and the processing for obtaining the second image during the preliminary light emission in parallel.

14. The image pickup apparatus according to claim 1, wherein in a case where it is determined by the determination unit that the predetermined condition is not satisfied, the control unit performs the first control.

15. The image pickup apparatus according to claim 14, wherein in the first control, the control unit controls the photometry unit during preliminary light emission by the light emission device to perform processing for obtaining the first image during the preliminary light emission and obtaining a third photometry result by performing photometry using the first image obtained during the preliminary light emission, controls the photometry unit after the preliminary light emission by the light emission device to perform processing for obtaining the first image after the preliminary light emission and obtaining a fourth photometry result by performing photometry using the first image obtained after the preliminary light emission, and perform processing for detecting a predetermined area using the first image obtained during the preliminary light emission, and determines the main light emission amount for causing the light emission device to perform the main light emission based on the third photometry result and the fourth photometry result.

16. The image pickup apparatus according to claim 15, wherein the control unit performs the processing for obtaining the third photometry result, the processing for detecting the predetermined area, and the processing for obtaining the first image after the preliminary light emission in parallel.

17. An image pickup apparatus that is capable of performing light emission photographing in which a light emission device is caused to emit light, the image pickup apparatus comprising:
at least one memory configured to store instructions; and
at least one processor configured to execute the instructions stored in the at least one memory to thereby implement:
a face detection unit configured to perform face detection processing on an image obtained using an image sensor, for detecting a face area from an object;
a calculation unit configured to calculate a main light emission amount of the light emission device based on information on the face area detected by the face detection processing, non-light emission image obtained using the image sensor without causing the light emission device to emit light, a preliminary light emission image obtained using the image sensor by causing the light emission device to perform preliminary light emission; and
a control unit configured to perform control, in a case where the face detection processing is performed on the preliminary light emission image, such that the non-light emission image is obtained after the preliminary light emission image is obtained.

18. The image pickup apparatus according to claim 17, wherein in a case where the face detection processing is not performed on the preliminary light emission image, the control unit performs control such that the preliminary light emission image is obtained after the non-light emission image is obtained.

19. The image pickup apparatus according to claim 17, wherein resolution of the non-light emission image is made different between a case where the face detection processing is not performed on the preliminary light emission image and a case where the face detection processing is performed on the preliminary light emission image.

20. The image pickup apparatus according to claim 17, wherein the face detection processing on the preliminary light emission image is performed in parallel with processing for obtaining the non-light emission image.

21. The image pickup apparatus according to claim 17, wherein in a case where no face area is detected before the preliminary light emission, the face detection processing is performed on the preliminary light emission image.

22. The image pickup apparatus according to claim 17, wherein in a case where a result of the photometry obtained before the preliminary light emission is lower than a predetermined value, the face detection processing is performed on the preliminary light emission image.

23. The image pickup apparatus according to claim 17, wherein in a case where an object distance is within a predetermined range, the face detection processing is performed on the preliminary light emission image.

24. A method of controlling an image pickup apparatus that photographs an object by causing a light emission device to emit light toward the object, comprising:
  selectively obtaining a first image having a first resolution and a second image having a second resolution lower than the first resolution, as a photometric image, and performing photometry using the obtained photometric image to thereby obtain a result of photometry;
  determining whether or not a predetermined condition is satisfied; and
  switching, when performing light control processing for determining a main light emission amount for causing the light emission device to perform main light emission for photographing the object, between first control in which the light control processing is performed based on the first image and second control in which the light control processing is performed based on the second image, according to a result of determination performed by said determining.

25. A method of controlling an image pickup apparatus that is capable of performing light emission photographing in which a light emission device is caused to emit light, comprising:
  performing face detection processing on an image obtained using an image sensor, for detecting a face area from an object;
  calculating a main light emission amount of the light emission device based on information on the face area detected by the face detection processing, non-light emission image obtained using the image sensor without causing the light emission device to emit light, a preliminary light emission image obtained using the image sensor by causing the light emission device to perform preliminary light emission; and
  controlling, in a case where the face detection processing is performed on the preliminary light emission image, such that the non-light emission image is obtained after the preliminary light emission image is obtained.

* * * * *